Dec. 12, 1961 C. A. HENSON ET AL 3,012,328
MANUAL SCALING DEVICE WITH ELECTRICAL DATA TRANSFER
Filed Oct. 18, 1957 4 Sheets-Sheet 2
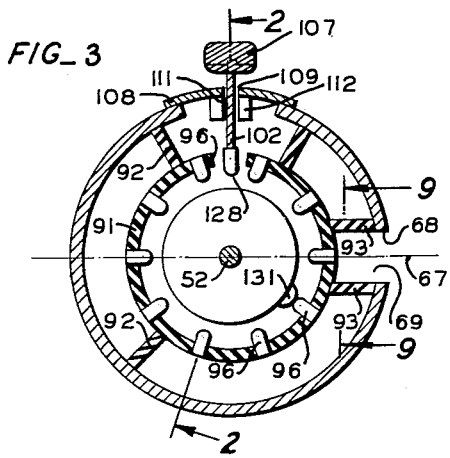
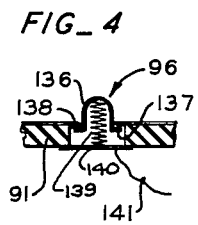
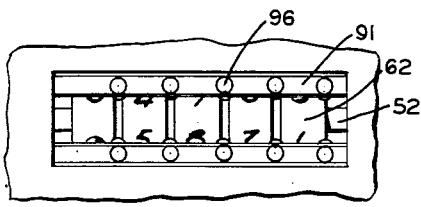
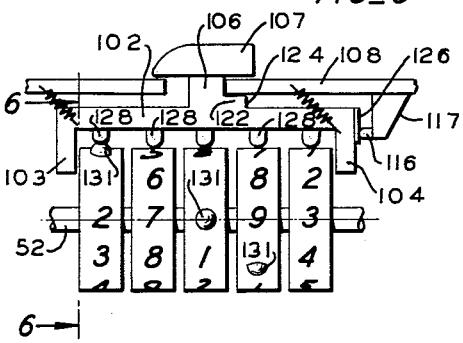
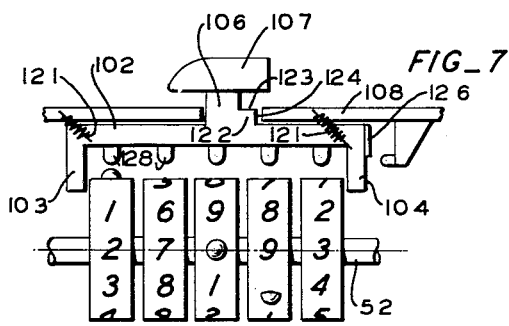
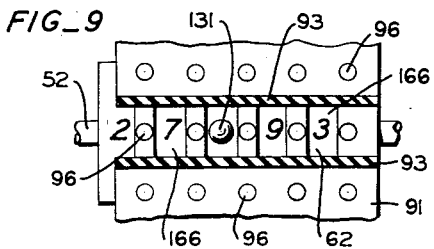
INVENTORS
CHARLES A. HENSON
THOMAS CHINN
BY Lothrop & West
ATTORNEYS

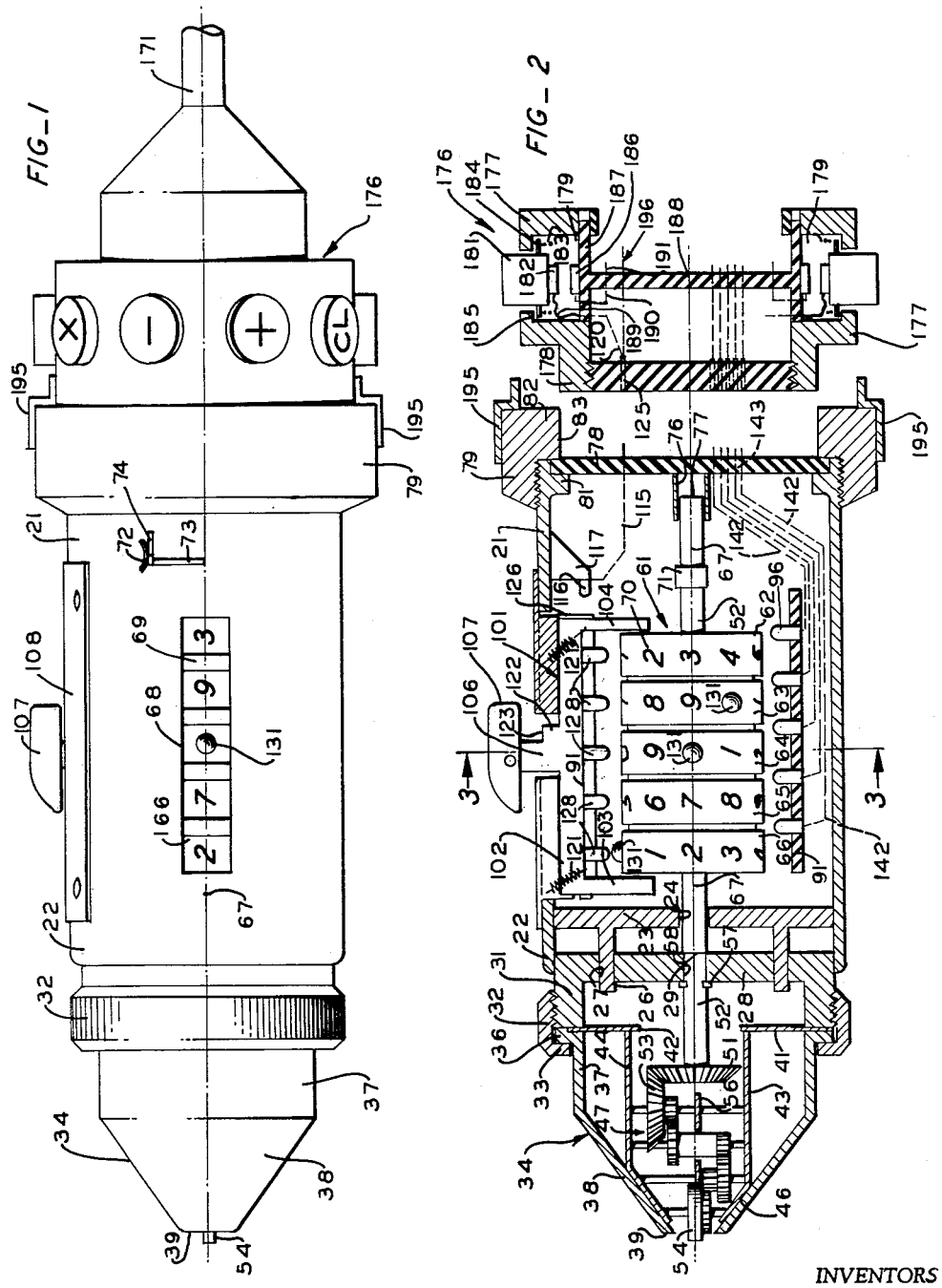

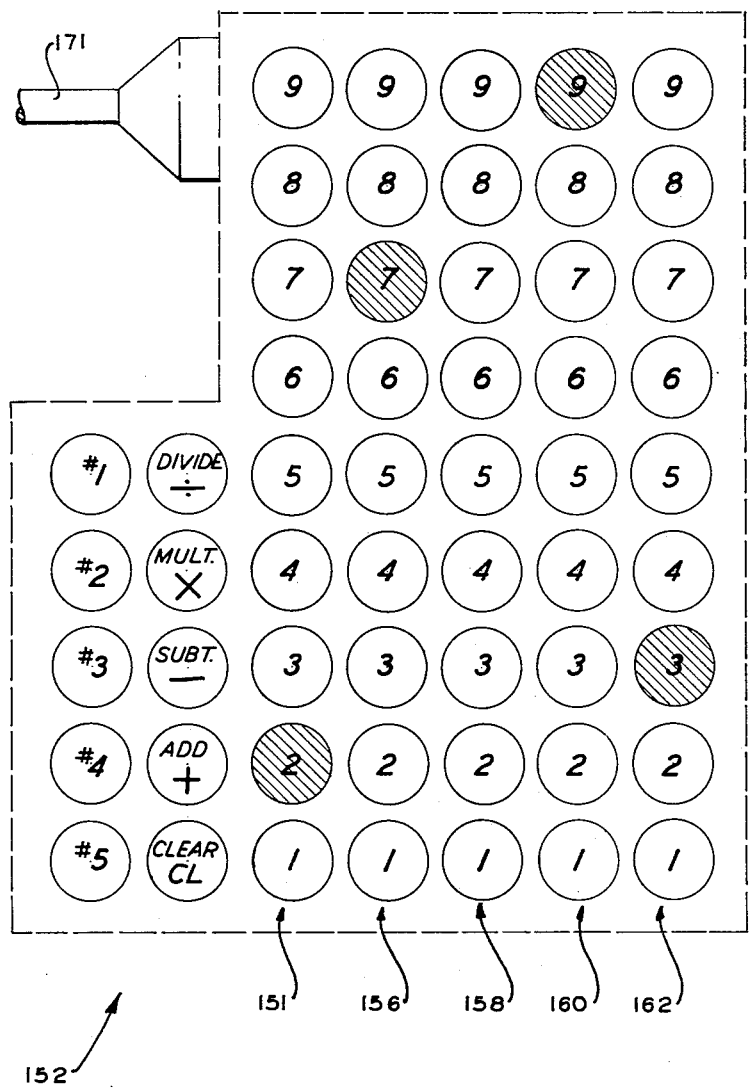

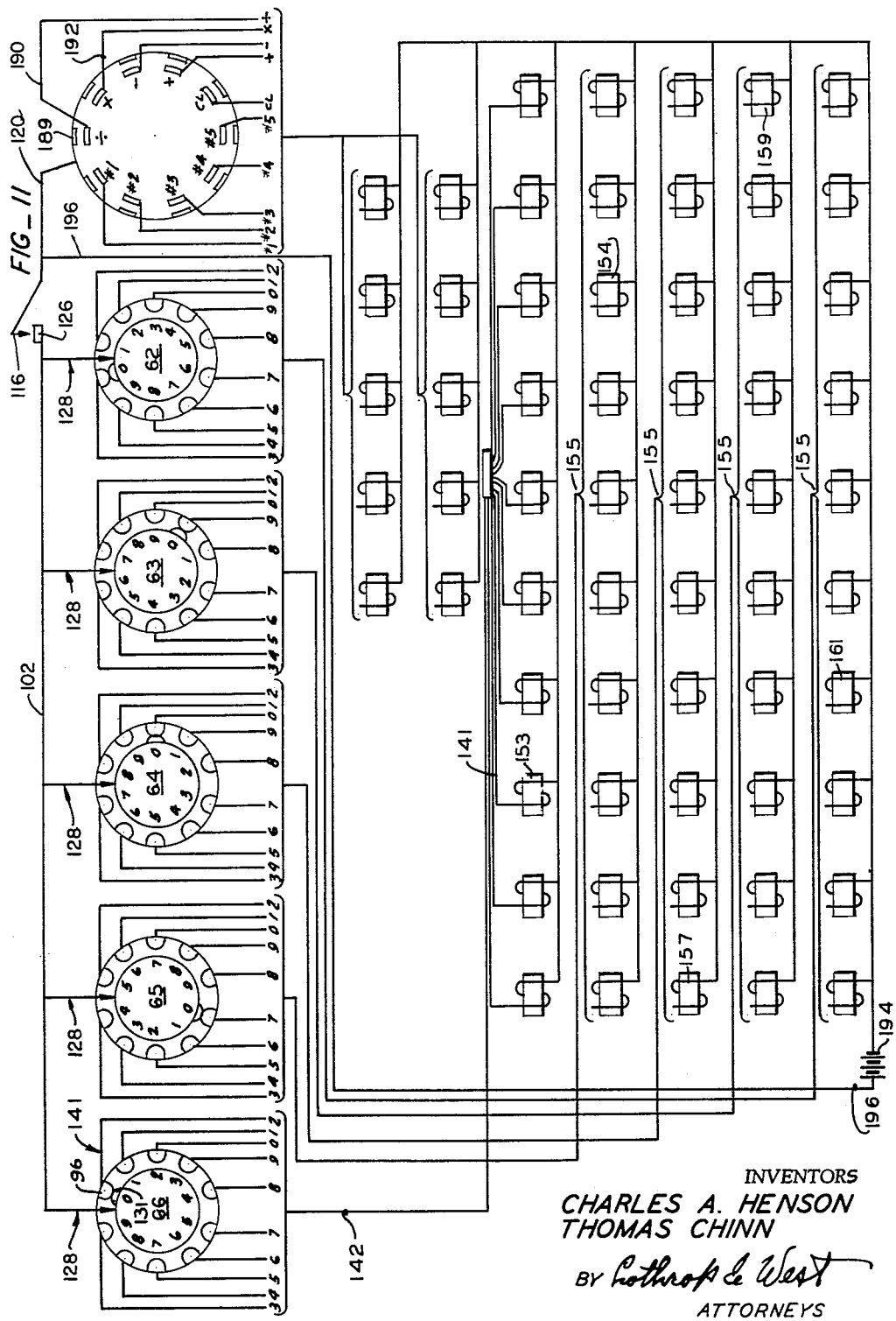

United States Patent Office 3,012,328
Patented Dec. 12, 1961

3,012,328
MANUAL SCALING DEVICE WITH ELECTRICAL
DATA TRANSFER
Charles A. Henson, 1919 9th Ave., and Thomas Chinn,
5340 11th Ave., both of Sacramento, Calif.
Filed Oct. 18, 1957, Ser. No. 691,062
1 Claim. (Cl. 33—141)

The invention relates to a measuring device or instrument for measuring distances on scaled plans, such as architectural and structural planes, and, more particularly, to an instrument for transferring the measured values to a computing device for subsequent mathematical operations in such device.

Considerable numbers and kinds of scaling devices have been made and used in the past, some with a reasonable amount of accuracy and facility. Inclusive of such devices have been mechanisms showing the measured values on a plurality of dials, or which shift a pointer along a linear scale. When hours of scaling and estimating are involved, the foregoing types of measuring instruments tend to tire the user's hand and mind, such fatigue often leading to costly inaccuracies. In addition, where operation on the measured values is required, for example, multiplication, addition, subtraction or division, the risk of errors is increased where the measured values must first be read off from a number of separate dials (e.g. units, tens, hundreds and thousands dials), or picked off from a pointer-scale, and then inserted by the user into a calculating machine.

It is therefore an object of the invention to provide a measuring device in which the risk of error is reduced to a minimum.

It is another object of the invention to provide a measuring device whose operation is extremely rapid.

It is still another object of the invention to provide a measuring instrument which can be used for long periods, and under conditions of urgency, without causing undue mental and physical fatigue to the operator.

It is yet another object of the invention to provide a measuring instrument which presents in direct, easy-to-read fashion, the actual measured values.

It is a further object of the invention to provide a device in which the information measured by a scaler can be transmitted directly to a computer.

It is still a further object of the invention to provide an instrument in which the measured values can either be read directly or transferred to a stored data or memory device.

It is yet a further object of the invention to provide a measuring instrument which is relatively economical, both with respect to initial cost and upkeep.

It is another object of the device to provide a generally improved measuring instrument.

Other objects, together with the foregoing are attained in the embodiment described in the following description and shown in the accompanying drawings in which:

FIGURE 1 is a side elevation of the scaler portion of the instrument;

FIGURE 2 is a median longitudinal section, the plane of section being indicated by the line 2—2 in FIGURE 3, some parts being shown in disassembled relationship and diagrammatically;

FIGURE 3 is a transverse section, the plane of section being indicated by the line 3—3 in FIGURE 2;

FIGURE 4 is a section of a typical spring-loaded contact utilized in various portions of the device;

FIGURE 5 is a side elevation of the transfer yoke in transfer position;

FIGURE 6 is a transverse section, the plane of section being indicated by the line 6—6 in FIGURE 5 and some of the parts being omitted for clarity;

FIGURE 7 is a side elevation of the transfer yoke in non-transfer position;

FIGURE 8 is a fragmentary plan view of the upper portion of the rotor and stator;

FIGURE 9 is a section of the side portions of the rotor and stator, the plane of section being indicated by the line 9—9 in FIGURE 3;

FIGURE 10 is a schematic showing of a typical computer used in conjunction with the scaler; and FIGURE 11 is a wiring diagram of the instrument.

While the measuring instrument of our invention is susceptible of numerous physical embodiments, the herein shown and described embodiment represents the preferred form.

Scaled plans of the architectural, structural and related varieties are drawn with great care and precision, and are widely used in estimating material requirements. Where large structures are involved, the task of assembling the required values is considerable. With the scaling equipment heretofore employed, errors are frequent, particularly where the operator becomes physically and mentally fatigued. Undue haste to meet a deadline also frequently contributes to costly mistakes in the preparation of bids based on the marshalled data.

The instrument of the invention, therefore, includes a scaler or scaler unit having a conveniently sized and proportioned housing 21, preferably a hollow right circular cylinder, for ease in holding the device in the operator's hand, similar to the fashion in which a pen or pencil is held.

The forward end 22, or lower end, when the scaler is in use, of the cylinder overhangs or extends beyond a transverse circular plate 23, having a central aperture 24, mounted coaxially on the cylinder. Projecting forwardly from the plate 23 is a plurality of guide pins 26 extending through registering apertures 27 in a flanged drum 28, the drum having a central opening 29, the drum 28 being translatable on the pins toward and away from the plate 23.

Clamped on the forward end of the drum flange 31, as by a knurled nut 32 in threaded engagement with the flange 31, the nut having an inwardly turned ring 33, is a scaler head 34. The scaler head comprises a base flange 36, a cylindrical portion 37 and a truncated tapered or conical portion 38 terminating in an open nose 39, or tip.

As appears most clearly in FIGURE 2, taking up on the knurled nut 32, or ring, clamps the head base 36 tightly against the drum flange 31, confining therebetween a transverse plate 41 having a central opening 42, the plate 41 serving as a mounting base for a gear casing 43 having a cylindrical portion 44 and a tapered portion 46 sloped at the same angle as the cone 38.

Rotatably mounted within the gear casing 43 is a plurality of intermeshing gears forming a gear train generally designated 47, the gears being suitably proportioned to correspond to the scale of the particular plan being scaled. A number of separate gear casings and attendant gear trains are used in conjunction with the device, each gear casing providing one of the more commonly used scale ratios.

The gear casings can be interchanged, it being merely necessary to unscrew the threaded ring 32 and remove the scaler head and gear casing, a bevel gear 51 on the forward end of the main drive shaft 52 being disengaged from a mating bevel gear 53 in the gear train. As the scaler head and gear casing are removed, the gear 51 on the shaft 52 passes outwardly through the opening 42 in the casing plate 41. The entire gear casing can thereupon be separated from the head and a new casing inserted, the corresponding forward tapered portions 38 and 46 of the head and casing, respectively, causing the new casing to center in proper fashion.

While each of the gear trains includes a main bevel gear 53 adapted to mate with the shaft bevel gear 51, and each train is connected at its forward end with a rotatable scaler wheel 54, projecting outwardly through the nose 39, the intermediate gears in each of the casings differ somewhat in size, ratios, and arrangement so as to match the scale of the plan to be used. Each of the gears is appropriately journalled in the casing walls, an interior longitudinal bearing wall 56 sometimes being used to add rigidity and to serve as a bearing for the gear shafts.

With the new casing installed and the bevel gears 51 and 53 in mesh, the lock ring 32 is taken up. Thereafter, the gear 51 and main shaft 52 rotate in accordance with the ratio of the newly installed gear train, a snap ring 57 serving, in conjunction with a shoulder 58 on the shaft, to restrain the shaft 52 and the drum 28 against relative axial translation and to move axially as a unit with the casing 34.

The scaler wheel 54 is placed at the start of a line to be scaled and is rolled along the line to the line's end. As the wheel rolls, the shaft 52 is rotated, in an amount dependent upon the ratio of the gear train. Rotation of the shaft 52, in turn, effects suitable rotation of a plurality of counters 61, or drums, there being, for example, a units counter 62, a tens counter 63, a hundreds counter 64, a thousands counter 65, and a ten-thousands counter 66. The counters are of conventional make and require no especial description except to state that whereas the units counter 62 rotates integrally, and thus continuously, with the shaft 52, the remaining counters rotate in the usual step-like or discrete fashion, that is to say, the tens counter 63 advances one whole number just as the last number on the units counter 62 arrives at and passes a predetermined location or plane, the plane being designated by the numeral 67, being a window frame 68 defining a window 69 in the side of the housing adjacent and straddling the plane 67 to permit observation of the row of subjacent numerical indicia 70. These indicia, as they appear most clearly in FIGURES 1 and 2 are the numerals "27093."

The counters are also provided, in customary fashion, with a re-set or zeroizing mechanism (not shown), which is actuated by movement of a re-set lever 71 and button 72 disposed exteriorly of the housing 21, as appears in FIGURE 1. A radial slot 73 and a longitudinal slot 74 permit movement of the button both in a peripheral direction to effect re-setting, and in a longitudinal direction as the shaft 52 is translated rearwardly to effect data transfer, as will be described hereinafter.

As appears most clearly in FIGURE 2, the rearward end of the shaft 52 is journalled in a sleeve 76, with sufficient space between the end 77 of the shaft and a base cap 78 of the housing 21 to permit of the end-wise movement of the shaft as data transfer is made. A keeper ring 79 is in threaded engagement with the after end of the housing 21 and serves to clamp the base cap 78 against a flange 81 formed on the housing 21, an annular flange 82 on the keeper 79 being urged against the periphery of the cap 78 as the ring is taken up. A central opening 83 is provided in the annular flange 82.

It can be seen that with the device so far described, rolling of the wheel 54 causes the counters to rotate so as to measure the distance traveled, the numerical indicia 70 indicating a full-scale value owing to the gear ratio utilized. The user, upon reading the value through the window can, if desired, note such value on a piece of paper or insert the value in a calculating machine by appropriate manipulation of the keyboard. Before going on to the next measurement, the zeroize button 72 is moved peripherally along the slot 73, at which time all counters will be returned to zero reading by the conventional counter re-set mechanism (not shown).

While notations on paper of the values measured may be satisfactory for a few measurements, very large jobs may require hundreds or even thousands of measurements. We have therefore provided mechanism for transferring the measured values directly from the scaler to an electric caluculator, electronic computer, punch-card or other data handling equipment, collectively termed computers.

Coaxially disposed around the periphery of the counters is a non-conductive sleeve 91, as shown most clearly in FIGURES 2 and 3, an appropriate plurality of non-conductive webbing members 92 and 93 serving to mount the sleeve, in rigid spaced fashion, on the housing 21.

Mounted on the cylindrical sleeve 91 and projecting radially inwardly is a plurality of sleeve contacts 96. The contacts are arranged in a plurality of spaced radial rows there being a row for each counter, each of the rows being spaced apart the same distance as the distance between the transverse center planes of the counters. Furthermore, in each of the rows there are ten equally spaced contacts, one corresponding to each of the ten numerical indicia on the counters.

In normal, or non-transferring position, however, the transverse radial plane through the center of each of the contact rows is not co-planar with the transverse central radial plane through the counters. Instead, the counters are displaced one half the distance between the rows in a direction toward the forward end of the scaler, as appears most clearly in FIGURES 2, 8 and 9. In order to bring the counters into registry with the contact rows, the counters, along with the shaft 52 and the entire scaler head 34, are shifted longitudinally toward the after end of the scaler. Shifting is accomplished by rearward translation of a mechanism termed a transfer bar, or transfer yoke, generally designated by the numeral 101. The transfer yoke 101 comprises an elongated bar 102 having depending from the forward end an arm 103 and from the after end an arm 104. Extending upwardly from the bar 102 is a neck 106 terminating in a transfer button 107 projecting exteriorly from an inspection plate 108, or cover, mounted on the housing 21 and provided with a longitudinal slot 109 in registry with a longitudinal track 111 defined by a pair of spaced parallel vertical plates 112 depending from the inspection cover. As the transfer button 107 is pushed rearwardly, the arm 103 pushes against the counter 66 which, in turn, urges the other counters and the shaft 52 in a rearward direction. Rearward movement is limited by abutment of the yoke with a contact 116 mounted on a terminal block 117 fastened to the housing 21. A pair of springs 121 on each side of the yoke urges the bar, the counters and the shaft in a forward direction to "normal" location, the arm 104 on the transfer bar pushing against the units counter 62 which in turn, moves the shaft, the other counters and the head.

As can be observed most clearly in FIGURES 2, 5 and 7, the after portion of the button neck 106 is enlarged to form an extension 122 providing a horizontal shoulder 123 and a vertical rear face 124. The distance between the shoulder 123 and the bottom surface of the button 107 is slightly in excess of the thickness of the inspection cover 108; consequently, as the button is depressed from the position shown in FIGURES 2 and 7 and is thence urged rearwardly to assume the location shown in FIGURE 5 the assembly shifted by the transfer bar will be in proper position for transferring the data on the counters.

In other words, with the transfer bar disposed in the location appearing in FIGURE 5, not only will the metal contact plate 126 on the after end of the metal transfer bar be in abutment with the contact 116 on the terminal block 117, but each of the contacts 128 depending from the transfer bar will be touching the metal rim of the adjacent counter. Additionally, the counters will have been brought into registry with the sleeve contacts.

As a result, therefore, of the depression and rearward translation of the transfer bar, electrical energy made available at the contact 116 on the terminal block 117 will flow to the rim of each of the counters.

With each of the counters being electrically charged, a signal from each of the counters can be initiated. The electricity on each counter has a return path through a raised mound 131, or contact, mounted on and over the zero indicium on each of the counters, the current passing through the zero counter contact 131 and into the adjacent one of the sleeve contacts 96 in abutment therewith.

Preferably, the sleeve contacts 96 are spring-urged, as is shown in some detail in FIGURE 4, each of the contacts including a dome 136 having an annular base 137 underlying an annular projection 138, a spring 139 urging the dome away from a lower cap 140 mounted on the sleeve 91.

Since each of the sleeve contacts 96 or stator contacts, is in radial registry with the adjacent numerical indicium (when the transfer bar is in transfer position) each of the counter contacts 131, or rotor contacts, will be touching one and one only of the stator contacts in each of the stator contact rows.

Consequently, an electrical current flows outwardly through each of the rotor contacts 131 and into the adjacent abutting one of the stator contacts 96.

Referring to FIGURES 4 and 11, it will be seen, in schematic form, that a separate electrical conductor 141 is attached to each of the stator contacts 96 and the ten conductors in each of the stator contact rows are led ouwardly from the scaler in a small cable 142, as is shown schematically in broken lines in FIGURE 2, the cables leading rearwardly and into the male connectors 143 disposed in the non-conductive scaler cap plate 78. Since there are five rows of counters, five separate cables (each containing ten conductors) are involved.

With the numerical value of "27093" shown in FIGURES 1 and 2, reference to FIGURE 11 will indicate that with the counter 66 in the attitude shown, current will flow through the transfer bar 101 across the counter rim to the counter contact 131, thence into the abutting stator contact 96 corresponding to the numeral "2," then along the conductor 141 corresponding to the numeral "2" and through the cable 142 which leads to the ten-thousands bank 151 in a computer 152, as appears in FIGURE 10. The conductor 141 corresponding to the numeral "2" separates at a convenient location in the computer from the other nine conductors and passes to a solenoid 153, or relay, or comparable element, and actuates the "2" key in the ten-thousands bank 151.

In comparable fashion, the "7" wire in the next stator row transmits a signal to the "7" solenoid 154 in the thousands bank 156, FIGURE 11 indicating only by a bracket the separation point 155 of the ten individual wires in this circuit and the remaining circuits in which the "0" wire is led to the "0" solenoid 157 in the hundreds bank 158, the "9" wire is led to the "9" solenoid 159 in the tens bank 160, and the "3" wire is led to the "3" solenoid 161 in the units bank 162.

Thus, upon depression and translation of the transfer button, the value "27093" is immediately and simultaneously transferred to the computer 152 from the scaler.

Upon releasing the transfer button, the springs 121 urge the transfer bar forwardly and upwardly into "normal" position. If desired, the re-set or zeroize button 72 can thereupon be utilized to return the counters to zero or base position. Return to zero can be checked by visual observation through the window frame 68, all of the rotor contacts 131 (covering zero position) being seen in alignment through a plurality of slots 166 in the sleeve or stator adjacent the plane 67 bisecting the window pane so that the counter numbers can be seen.

Since the counters other than the units counter 62 only move in discrete intervals there is never any question but what optimum contact will always obtain between the counter contacts 131 of such counters and the stator contacts 96. The units counter 62, however, moves continuously and the same degree of excellent contact will not always obtain unless, by chance, scaling is terminated exactly when the last digit is in perfect alignment with the remaining numbers. Actual practice indicates, however, that owing to the width of the rotor and stator contacts, a very satisfactory current-conducting contact is realized even when some misalignment of the last digit obtains. In any event, the wheel can be moved very slightly to effect contact without affecting the results significantly, such movement preferably being such as to bring the closest digit into alignment, any slight errors being thereby self-cancellable.

With the numeral "27093" having been transferred to the computer and the counters reset to zero, the operator can proceed to measure the next dimension. Upon completion of such measurement, the measured value is again transferred to the computer. The term computer is intended to cover a wide variety of equipment and includes devices in which each value, as it is inserted in the machine, is "stored" so as to be susceptible of being operated on by subsequent transferred values in terms of addition, subtraction, multiplication or division, or other types of operations.

It will be assumed that in the instant case the value "27093" is found to define each wall dimension of a square room and it is desired to find the area of the room. Multiplication of the two values is obviously called for. Mechanism is provided for effecting this operation remotely, that is to say, from the scaler itself, which may be several feet from the computer, the connection being a plug-in flexible conduit 171 containing the numerous conductors.

Said mechanism, termed a control unit, is designated by the numeral 176 and includes an annular ring 177 having a forward flange 178. The ring 177 is provided, around its rim, with a plurality of counterbores 179, one for each of the four common operations, one for "clear" and several spare or additional stations for such other operations as may be desired. An operation button 181 with a button contact 182 is disposed in each cavity. A spring 183 pressing against an annular shoulder 184 formed on the button urges the button outwardly against the counterbore shoulder 185. Adapted to be abutted by the contact 182 is an inner contact 186 mounted on the peripheral flange 187 of a transverse web 188. The button contact 182 is placed at common ground potential owing to the provision of a conductor 196 leading from an energy source 194, a cable 120 and a wire 189 connecting the conductor 196 to the button contact 182. A female contact 125 as appears in FIGURE 2, serves to place the terminal block 117 at common ground potential as the control unit is plugged into the bore 83 at the base of the counter unit, a wire 115 being provided to connect the block 117 and the contact 125. A conductor 190 passes from the contact 186 through the web 188 to form a male connector 191 adapted to engage an appropriate lead 192 within the conduit 171, the wire 192 being indicated in FIGURE 11.

It is clearly to be understood that although the cable 120 and the wire 189 are indiced in FIGURE 2 as single lines that in fact they represent a plurality of separate conductors, each of the conductors leading to a button contact, similar to the button contact 182, in each of the control unit stations. This is clearly apparent from a study of FIGURE 11. It is also to be recognized that while the leads 190, 191, and 192 are shown as leading from the multiplication contact 186, comparable conductors are provided for the other stations as well. Thus, the electrical energy source 194 has one lead 196 common to the terminal block 117, and the transfer yoke 101 and to the several button contacts, as appears in FIGURE 11, when the plug 176 is inserted in the opening 83. A pair of straps 195 is sometimes used to assist in maintaining the control unit in snug relation with the counter unit. The other lead travels, in parallel fashion, to the various computer solenoids, thence to the various stator contacts 96 and the control unit contacts as, for example, the contact 186 shown in FIGURE 2.

Having previously transferred the "27093" value to the computer and having again arrived at a value of "27093" it is only necessary that the operator depress the "X" or "multiply" button and actuate the transfer button in appropriate sequence depending on the computer construction, which construction forms no direct part of the present invention. Upon completion of the computation the operator need only read the product from the computer and copy the product on suitable data sheets, or in the case of punch card or other "memory" devices, proceed immediately to clear the figure by depressing the "clear" button and go on with the next measurement.

As is indicated in FIGURES 10 and 11, at least five additional or spare control units, each in parallel, are provided. Thus, in addition to the multiplication, addition, subtraction, division and "clear" operations, at least five other operations are made available. Should it be desired, for example, that the values inserted in the computer be punched on a card, depression of the button corresponding to #1 control, or #1 spare, provides a signal which, when led to an appropriate type of computer, could actuate a card punch.

It can therefore be seen that we have provided a highly versatile measuring instrument which not only increases greatly the speed and accuracy of scaling from plans, but which also permits the values so scaled to be handled in a manner which is flexible, rapid and accurate.

What is claimed is:

A manual scaling device with electrical data transfer comprising a cylindrical housing, a scaler head mounted on one end of said housing, a scaling wheel projecting from said scaler head, a shaft rotatably mounted on said housing in coaxial relation therewith, gear means in said scaler head connecting said scaling wheel and said shaft for concurrent rotation, a plurality of current conducting drums mounted on said shaft, said drums having numerical indicia marked on the periphery thereof, means for proportionally rotating said drums in acordance with the rotation of said shaft, a counter contact projecting from each of said drums at the zero numerical indicium thereof, a non-conducting sleeve mounted on said housing concentric with said drums, a plurality of conducting contacts mounted in said sleeve in groups with the conducting contacts in each group in wiping position with a respective one of said counter contacts, there being one of said conducting contacts for each of said numerical indicia, a longitudinal current conducting bar mounted adjacent the inner wall of said housing, manually operable means on the outside of said housing for moving said bar from a first position remote from said drums to a second position in current conducting contact therewith, means for conducting an electrical current to said bar from a point outside said housing when said bar is in said second position, and means for conducting current from said sleeve conducting contacts to said point outside said housing.

References Cited in the file of this patent

UNITED STATES PATENTS

| | | |
|---|---|---|
| 1,829,233 | Morss et al. | Oct. 27, 1931 |
| 1,835,804 | Morra | Dec. 8, 1931 |
| 2,294,566 | Malm et al. | Sept. 1, 1942 |
| 2,469,754 | Tierney | May 10, 1949 |
| 2,483,709 | Wittenmyer | Jan. 3, 1950 |
| 2,518,378 | Roggerstein | Aug. 8, 1950 |

FOREIGN PATENTS

| | | |
|---|---|---|
| 785,054 | Great Britain | Oct. 23, 1957 |